Patented Mar. 16, 1954

2,672,419

UNITED STATES PATENT OFFICE 2,672,419

CHOCOLATE MIX

Gerald C. North, Ralph A. Klein, and Peter P. Noznick, Chicago, Ill., assignors to Beatrice Foods Company, Chicago, Ill., a corporation of Delaware No Drawing. Application March 9, 1951,
Serial No. 214,830

1 Claim. (Cl. 99—25)

This invention relates to an improved concentrated frozen mix which, upon thawing and dilution with hot or cold water, produces a very pleasant and palatable chocolate drink.

The concentrate comprises whole, partially defatted or skim milk and mixtures of the same, sugar, chocolate flavoring ingredient, a stabilizer and any desirable chocolate enhancing flavor.

One critical feature of the invention surrounds the concentration of the product so that (a) the proteins are prevented from precipitating out and thereby causing flecking when the concentrate is diluted, and (b) reconstitution with cold water can be successfully carried out to obtain four volumes of the reconstituted product or with hot water to produce two or three volumes of hot chocolate.

Another feature of the invention is that the process of freezing a 3½ to 1 concentration of chocolate mix prevents the undesirable onset of graininess of the concentrated mix as caused by lactose crystallization.

The concentrated frozen chocolate mix, as a syrup or diluted as desired, may be used as a topping for ice cream and other desserts and also may be employed in making ice cream and other frozen desserts.

An important feature of the present invention, and one which distinguishes it from prior attempts to make an improved concentrated frozen mix of this character, is the remarkable property possessed by the product whereby it will resist wide temperature fluctuations, e. g., freezing and thawing and dilution without producing flocculation or injury to the taste or keeping qualities. For instance, the concentrate has been frozen to −10° F., stored at 0° F. for at least six months, dropped to −40° F., thawed to 40° F., frozen again to −40° F., then thawed and reconstituted to four volumes with cold water and kept in a domestic refrigerator for an indefinite period without exhibiting any change in taste or showing curdling effects and remaining free of precipitated flakes. We attribute the ability of the product to absorb such temperature shocks to the concentrating process employed and also to the presence of the sugar.

By "frozen" with regard to the product is meant the condition in which it will no longer pour freely and in which it will keep indefinitely with no change in the quality of the reconstituted product. When frozen, the product does not harden but is flexible as distinguished from a stiff frozen condition, indicating the presence of a fluid solution or a super-cooled liquid (fluid) which tends to keep the proteins in a soluble condition, i. e., the proteins are not insolubilized.

The thawed product is liquid and flowable so that it can be readily poured into a suitable container and thereafter mixed with three or less volumes of cold or hot water which can be measured by using the container in which the concentrated mix is distributed commercially.

In carrying out the invention, from about 90 pounds to about 100 pounds of preferably homogenized whole milk, partially defatted milk or skim milk, or a mixture of these milks, and preferably milk containing about 1% butter fat, and having temperature of about 120° to 140° F., preferably 135° F., is mixed with from about 10 pounds to about 12 pounds of chocolate flavored syrup containing sugar, chocolate flavoring ingredients, e. g., cocoa and/or chocolate, a chocolate enhancing flavor such as vanilla, vanillin, malt, etc., and a stabilizer for the cocoa or chocolate which does not give excessive viscosity at high concentrations of the mix in unfrozen condition such as carageenin, sodium alginate, locust bean gum and gum karaya, the syrup having a temperature substantially the same as that of the milk. Preferably, three-fourths of the estimated required amount of the syrup is added at this time, e. g., 8 pounds for a purpose which will later appear.

The total sugar, which may be all or only partly present in the chocolate flavored syrup, will constitute about 18% to 30%, preferably about 19% to 23% of the concentrate, excluding milk sugar. Sugar such as cane sugar and beet sugar, liquid sugar from sugar cane or beets, corn sugar, dextrose, corn syrup of various degrees of enzymatic hydrolysis (high conversion and low conversion corn syrup), malt syrup, invert sugars, and invert syrups, are useful and, as stated, may be included in the chocolate flavored syrup as such, or separately added.

This mix is heated to a temperature between about 155° and 185° F., preferably to about 160° F.–165° F. for about ten to thirty minutes and is then drawn into a vacuum pan and condensed at about 120° to 145° F., preferably about 135° F. until the concentration is about 50% to 58% total solids.

Thereafter, there is preferably added to the concentrated mix in the vacuum pan the remaining one-fourth of the syrup which has been previously heated to about 155° to 185° F. for about ten to thirty minutes in order to destroy bacteria, enhance the chocolate flavor and add to the bouquet of the finished product. This increases the concentration of the mix to about 52% to 62% total solids. As stated above, the solids concentration is critical, and we find that a concentration in the final product of less than about 3 to 1 is objectionable because of ice or ice crystal formation. Where the concentration is greater than 3 to 1, this ice formation is minimized. Preferably, the concentration of the final product is at least 3 to 1 and between about 3+ to 1 and 4 to 1, as represented by a final total solids content of about 52% to 62% in the product.

In connection with the use of the syrup containing chocolate flavoring ingredients, sugar, chocolate enhancing flavor and stabilizer as above-described, it is possible, in some cases, to introduce all of the sugar, chocolate enhancing flavor and stabilizer initially and thereafter merely to add to the concentrated product the remainder, usually one-fourth, of the syrup containing the chocolate flavoring ingredient, i. e., without further introduction of additional sugar, chocolate enhancing flavor and stabilizer. In some cases, however, it is preferable to not only introduce the syrup containing the chocolate flavoring ingredient in increments, but one or all of the other ingredients in the same manner before and after concentration, as recited.

The condensed mix having a temperature in the range of about 120° to 145° F. is poured into cans, sealed immediately and then pre-cooled in a liquid coolant such as alcohol and water (maintained at the appropriate temperature by means of a suitable cooling coil or circulating system) to a temperature not above about 45° to 50° F., measured at the center of the can. Thereafter, the pre-cooled cans are frozen in a sharp freezer having a temperature of about −10° to −40° F.

Alternately, the condensed mix having a temperature within the range of about 120° to 145° F. is pre-cooled to a temperature of about 30° to 50° F. by passing through a suitable cooling means such as a "Votator" and is then poured into cans, sealed, labeled and placed in a sharp freezer having a temperature of about −10° to −40° F.

As heretofore explained, by concentrating the mix to between about 50% to 58% solids and then increasing the concentration by adding an additional ingredient or ingredients to provide about 52% to 62% total solids, when the mix is reconstituted with water, it is possible (a) to obtain four volumes of the product, and (b) the reconstituted product is markedly free of precipitated proteins and other objectionable flecking and has a delicious flavor and a desirable body. These results are directly attributable to the discovery that concentration, as described, is critical.

Of particular importance, the process of concentrating herein described in combination with the total sugar present overcomes heretofore insuperable difficulties in that, as explained above, the concentrated frozen mix may be subjected to a wide range of temperature fluctuations and be diluted with hot and cold water without causing objectionable change of taste or producing flaking or precipitation, and with a complete avoidance of curdling. Equally important, it is a characteristic of the improved product that it retains its keeping qualities through a wide range of temperature fluctuations and dilution with water.

We claim:

The method of making a frozen concentrated mix comprising mixing milk with a chocolate flavoring ingredient, sugar, and a stabilizer for the chocolate flavoring ingredient which does not give excessive viscosity at high concentration in the unfrozen condition, heating said mix to a temperature between about 155° and 185° F. for about ten to thirty minutes, concentrating the mix to about 50% to 58% total solids at a temperature between about 120° and 145° F., and introducing to the concentrated mix additional chocolate flavoring ingredient to give a total solids content of about 52% to 62% total solids, pre-cooling the condensed mix to a temperature between about 30° to 50° F., and freezing the mix.

GERALD C. NORTH.
RALPH A. KLEIN.
PETER P. NOZNICK.

References Cited in the file of this patent

UNITED STATES PATENTS

| Number | Name | Date |
| --- | --- | --- |
| 2,097,225 | Green | Oct. 26, 1937 |
| 2,101,374 | Tucker | Dec. 7, 1937 |
| 2,267,624 | Siehrs | Dec. 23, 1941 |

FOREIGN PATENTS

| Number | Country | Date |
| --- | --- | --- |
| 501,065 | Great Britain | of 1939 |